United States Patent
Yamagishi et al.

[11] Patent Number: 5,169,268
[45] Date of Patent: Dec. 8, 1992

[54] METHOD OF MEASURING SUPPLY RATE OF INCINERATION WASTE

[75] Inventors: Mikihi Yamagishi; Takashi Yokoyama; Yasuo Suzuki; Haruhito Tsuboi; Takashi Noto; Masaaki Kawakami, all of Tokyo, Japan

[73] Assignee: NKK Corporation, Tokyo, Japan

[21] Appl. No.: 777,326

[22] PCT Filed: Mar. 27, 1991

[86] PCT No.: PCT/JP91/00398
§ 371 Date: Nov. 25, 1991
§ 102(e) Date: Nov. 25, 1991

[87] PCT Pub. No.: WO91/14914
PCT Pub. Date: Oct. 3, 1991

[30] Foreign Application Priority Data
Mar. 27, 1990 [JP] Japan .................. 2-77381

[51] Int. Cl.⁵ .............................. F23G 5/00
[52] U.S. Cl. ..................... 110/346; 110/186; 110/245
[58] Field of Search .......... 110/185, 186, 245, 346, 110/101 R

[56] References Cited
FOREIGN PATENT DOCUMENTS

| | | |
|---|---|---|
| 3512061 | 10/1985 | Fed. Rep. of Germany ...... 110/186 |
| 53-148165 | 12/1978 | Japan . |
| 0000419 | 1/1982 | Japan .................. 110/186 |
| 57-184920 | 11/1982 | Japan . |
| 60-57523 | 12/1985 | Japan . |

Primary Examiner—Edward G. Favors
Attorney, Agent, or Firm—Frishauf, Holtz, Goodman & Woodward

[57] ABSTRACT

The present invention relates to a method of measuring a supply rate of incineration waste in a fluidized-bed incinerator.

The method is characterized in that a passing state of incineration waste (3) is detected by an photoelectric element (1) arranged on a chute (2) for supplying the incineration waste from a dust feeder (4) to an incinerator (5), and a rate of waste (w) is calculated from a detection signal from the photoelectric element in accordance with the following equation:

$$w = A \times \sum_{k=1}^{m} \frac{tK}{T}$$

where w: supply rate of waste per unit time; m: the number of photoelectric elements; t: detection signal time per unit time; T: unit time; and A: constant.

2 Claims, 3 Drawing Sheets

METHOD OF MEASURING SUPPLY RATE OF INCINERATION WASTE

TECHNICAL FIELD

The present invention relates to a method of measuring a supply rate of waste charged in a fluidized-bed incinerator.

BACKGROUND ART

As shown in FIG. 6, in a fluidized-bed incinerator 5, fluidized sand of a fluidized bed 11 constituted by the fluidized sand circularly supplied to the lower portion of the incinerator is preheated to a temperature of about 600° C., and fluidizing air 16 allows the sand to flow. In this state, combustion materials supplied from a charge chute 2 are combusted for a short time. An unburnt gas on the fluidized bed 11 is combusted by secondary air 15 supplied to a free board portion 13, and a combustion exhaust gas 14 is exhausted from a top portion of the incinerator 5.

Uncombustibles contained in the combustion materials are exhausted from the bottom portion of the incinerator 5 together with the fluidized sand. The fluidized sand is separated from the uncombustibles and recycled in the incinerator.

Even in an incinerator for performing combustion processing of waste, a combustion system of the incinerator must be appropriately controlled. Especially, since a charge rate of waste charged in the incinerator is a factor to be managed as a load of a combustion control operation, a means for appropriately measuring the supply rate of waste is required.

In a conventional means for measuring an amount of waste, as is disclosed in Published Unexamined Japanese patent application No. 53-148165, an oxygen concentration in an exhaust gas is detected, and a charge rate of waste is indirectly estimated. Thus, a supply rate of waste is controlled on the basis of charge rate data obtained by the estimation.

As another means, incineration waste is directly measured using a meter, and a combustion control operation is performed on the basis of the measurement data.

PROBLEM TO BE SOLVED BY THE INVENTION

The measurement using an exhaust gas analyzing meter for analyzing an oxygen concentration is delayed from an actual change in gas concentration of the exhaust gas by several tens of seconds. Therefore, in a fluidized-bed incinerator in which a combustion reaction is instantaneously performed, a control operation of a supply rate of waste is not effective for stabilizing the combustion control operation.

In a method of directly measuring a supply rate of incineration waste, the durability of a meter against decomposed matter or sludge included in the incineration waste causes a problem, and the meter cannot accurately measure the amount of incineration waste when the decomposed matter or sludge is attached to the meter.

It is an object of the present invention to provide a method of measuring a supply rate of incineration waste so as to solve the above problem.

DISCLOSURE OF INVENTION

According to the present invention, in a fluidized-bed incinerator, a method of measuring a supply rate of incineration waste is characterized by detecting a passing state of the waste by a photoelectric element arranged on a chute for supplying incineration waste from a dust feeder to the incinerator and measuring a supply rate of waste (w) from a detection signal in accordance with the following equation:

$$w = A \times \sum_{k=1}^{m} \frac{tK}{T}$$

where
w: supply rate of waste per unit time
m: the number of photoelectric elements
t: detection signal time per unit time
T: unit time
A: constant

Function

The supply rate of waste can be detected by the photoelectric element arranged on the shoot for charging incineration waste in the incinerator. In addition, since the photoelectric element is not easily corroded and damaged, stable measurement can be performed for a long period.

Since the supply rate of waste can be sequentially measured without a time lag, a stable combustion control operation can be performed.

EMBODIMENT

An embodiment of a method according to the present invention will be described below with reference to the accompanying drawings.

Figure 1:
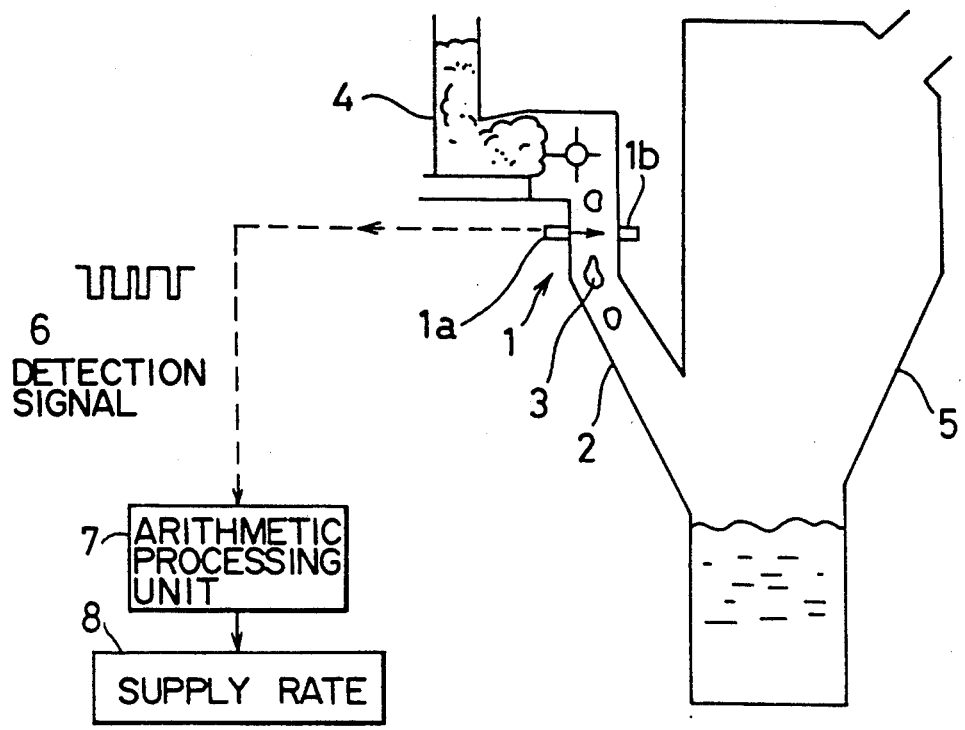
FIG. 1 is a view for explaining an arrangement of an apparatus for embodying a method according to the present invention.

First, an arrangement of an apparatus for carrying out the present invention will be described below with reference to FIG. 1.

A photoelectric element 1 for detecting a passing state of incineration waste 3 is arranged on a chute 2 for charging the incineration waste 3 from a dust feeder 4 to an incinerator 5. A detection signal 6 from the photoelectric element 1 is supplied to an arithmetic processing unit 7 to measure a supply rate of waste.

Figure 2:
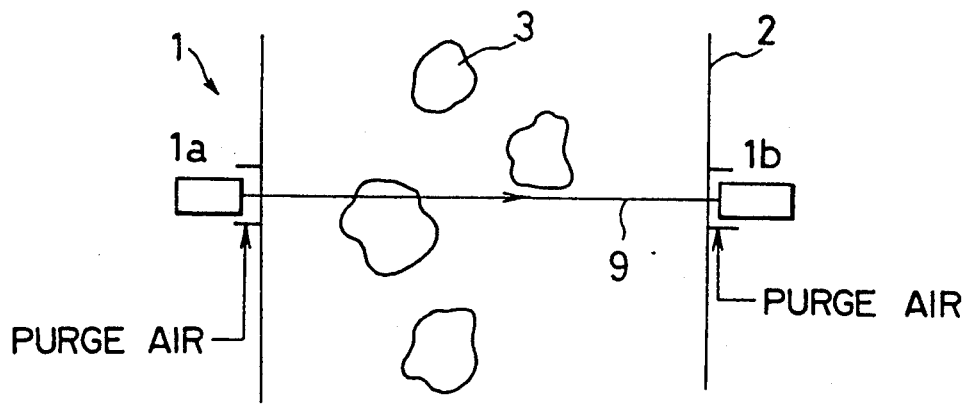
FIG. 2 is a view for explaining a set state of a photoelectric element.

In this embodiment, as shown in FIG. 2, a transmission photoelectric switch constituted by a pair of a light-emitting portion 1a and a light-receiving portion 1b is used as the photoelectric element 1. Since the photoelectric element 1 is not in contact with the incineration waste 3, the photoelectric element 1 is not easily corroded and damaged by the incineration waste 3. In order to prevent supply of a high-temperature exhaust gas to the photoelectric element 1 caused by an increase in internal pressure of the incinerator, purge air flows between the light-emitting portion 1a and the chute 2 and between the light-receiving portion 1b and the chute 2. An amount of the purge air is adjusted within a range of 5 to 200 Nm³/h.(pair count) according to various factors such as kinds of incineration waste and a setting value of a pressure in the incinerator.

Figure 3:
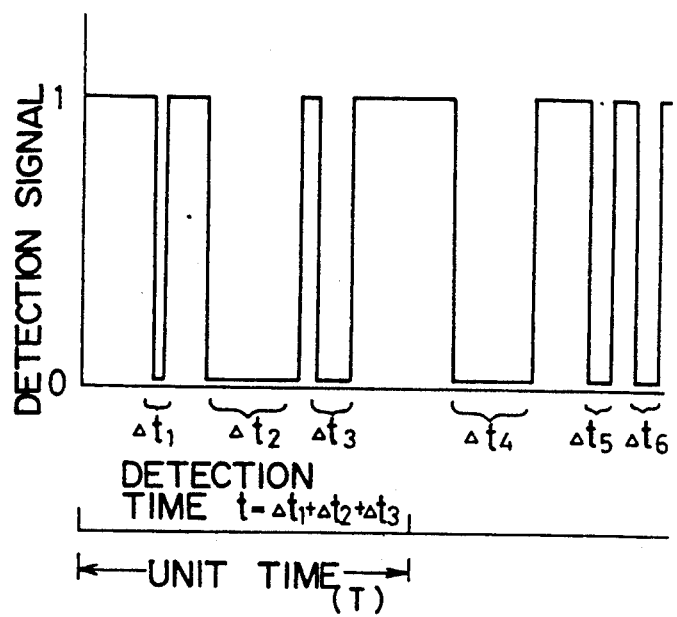
FIG. 3 is a view for explaining a detection signal from the photoelectric element.

When an optical path 9 of the photoelectric element 1 is interrupted by the incineration waste 3, the light-receiving portion 1b does not sense the light from the light-emitting portion 1a and outputs a detection signal while the light-receiving portion 1b does not sense the light. FIG. 3 shows an output of the detection signal. A value of "1" or "0" is output as the detection signal in response to the presence/absence of the incineration waste 3. The detection signal shown in FIG. 3 is processed such that the detection signal is set to be "0" when the incineration waste 3 interrupts the optical path 9 of the photoelectric element 1. The detection signal may be processed such that the detection signal is set to be "1" when the incineration waste 3 does not interrupt the optical path 9 of the photoelectric element 1. While the incineration waste 3 interrupts the optical path 9 of the photoelectric element 1, the detection signal has the value "0". A supply rate of the incineration waste 3 can be calculated by the "0"-value duration of the detection signal.

Figure 4:
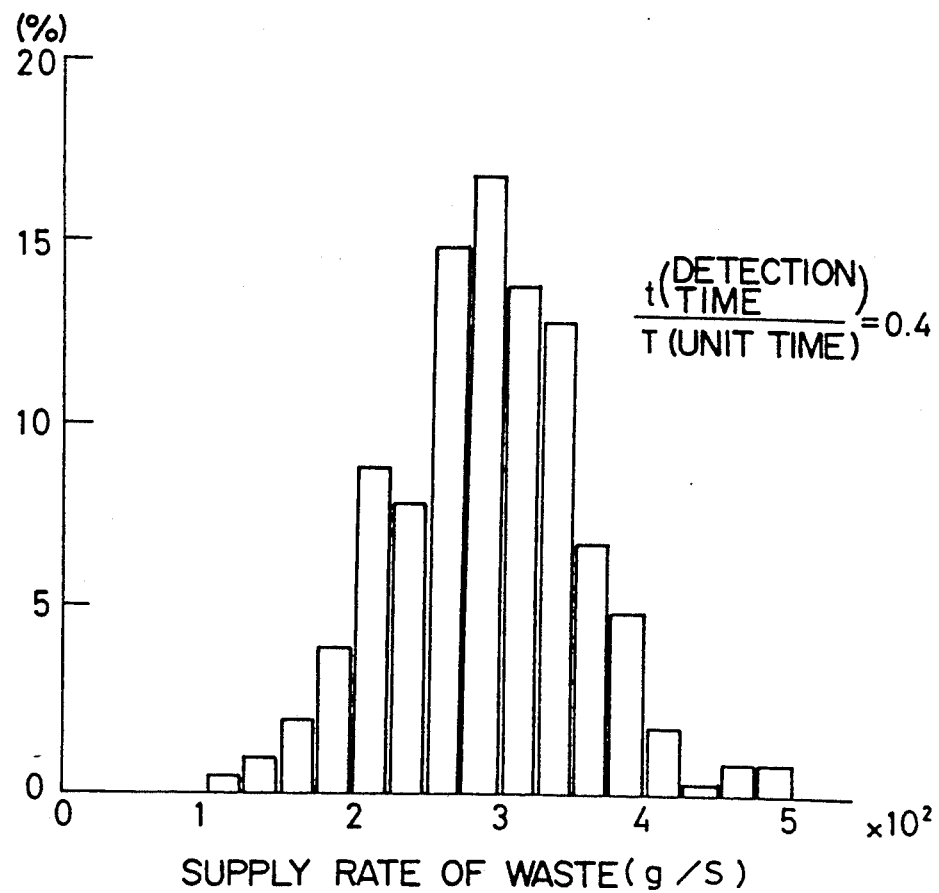
FIG. 4 is a graph showing a distribution of a supply rate of waste, which was recorded when value t/T (detection time/unit time) was 0.4.
Figure 5:
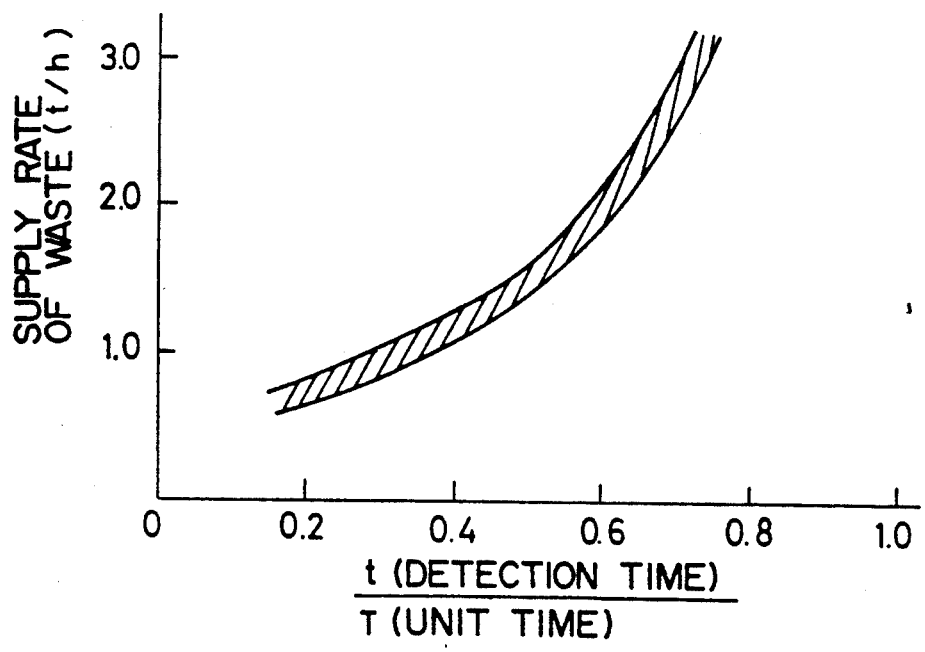
FIG. 5 is a view for explaining a relationship between a value t/T (detection time/unit time) and a supply rate of waste.
Figure 6:
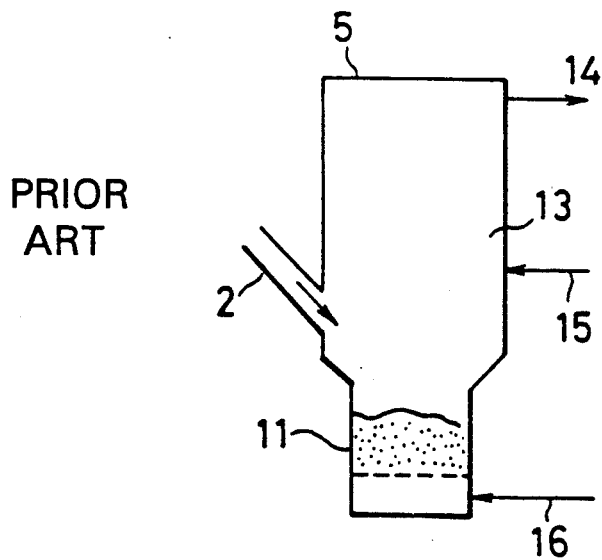
FIG. 6 is a view for explaining a fluidized-bed incinerator.

FIG. 4 is a view showing a distribution obtained by integrating and processing a large number of data when a unit time T was set to be 1 s and a detection time t obtained by detecting the incineration waste 3 was set in a condition of t/T=0.4. According to the distribution, a supply rate of waste to an incinerator can be obtained corresponding to the value t/T.

Data shown in FIG. 4 related to various values of t/T are obtained, the data are arranged to obtain correlation data between values t/T and supply rates with respect to a kind of waste. Correlation data with respect to other kinds of waste are obtained, as described above.

Thus, an arithmetic equation of $$w = A \times t/T$$

where
w: supply rate per unit time
t: detection signal time per unit time
T: unit time
A: constant corresponding to a kind of waste is obtained. The arithmetic equation is operated by the arithmetic processing unit 7 (FIG. 1), thereby measuring a supply rate of waste.

In the above embodiment, although the unit time T is set to be 1 s, the unit time T may be set within a range of 1 ms to 10 s.

Since a supply rate of waste measured as described above is sequentially input to a combustion control system, a stable combustion control can be performed.

In the above embodiment, one photoelectric element 1 is used. However, several photoelectric elements 1 may be arranged on the chute 2 in the sectional direction of the chute or in a flowing direction of waste in an incinerator.

In this case, the following arithmetic equation can be obtained:

$$w = A \times \sum_{k=1}^{m} \frac{tK}{T}$$

where
m: the number of photoelectric elements
A: constant
The supply rate can be represented by a combination of detection signals from the several photoelectric elements. In this case, measurement accuracy can be improved compared with use of one photoelectric element.

Although a transmission photoelectric switch is used as a photoelectric element in the above embodiment, a reflection photoelectric element or a laser transmission/reception element can be used as the photoelectric element.

EFFECT OF THE INVENTION

As described above, in a method of measuring a supply rate of incineration waste according to the present invention, a photoelectric element arranged on a chute for charging the incineration waste in an incinerator can detect the waste without being in contact with the waste. Therefore, since the photoelectric element is not easily corroded or damaged, stable measurement can be performed for a long period.

In addition, since a supply rate of waste can be sequentially measured without a time lag a stable combustion control operation can be performed.

We claim:
1. A method of measuring a supply rate of incineration waste in a fluidized-bed incinerator, comprising the steps of:
   detecting a passing state of the waste supplied along a supply means which extends from a dust feeder to the incinerator by at least one photoelectric element arranged on supply means,
   producing a detection signal in response to said step of detecting, and
   measuring a supply rate of waste (w) in response to said detection signal in accordance with the following equation:

$$w = A \times \sum_{k=1}^{m} \frac{tK}{T}$$

where
w is the supply rate of waste per unit time,
m is the number of photoelectric elements,
t is a detection signal time per unit time,
T is a unit time, and
A is a constant.
2. The method of claim 1, wherein said supply means comprises a chute, and wherein sid detecting step detects a passing state of the waste along said chute.
* * * * *

UNITED STATES PATENT AND TRADEMARK OFFICE
CERTIFICATE OF CORRECTION

PATENT NO. : 5,169,268
DATED : December 8, 1992
INVENTOR(S) : YAMAGISHI et al It is certified that error appears in the above-identified patent and that said Letters Patent is hereby corrected as shown below:

TITLE PAGE -

Under Section [75] Inventors:

Change "Miki<u>hi</u> YAMAGISHI" to --Miki YAMAGISHI--.

Signed and Sealed this

Seventh Day of December, 1993

Attest:

BRUCE LEHMAN

Attesting Officer

Commissioner of Patents and Trademarks